United States Patent Office 3,340,204
Patented Sept. 5, 1967

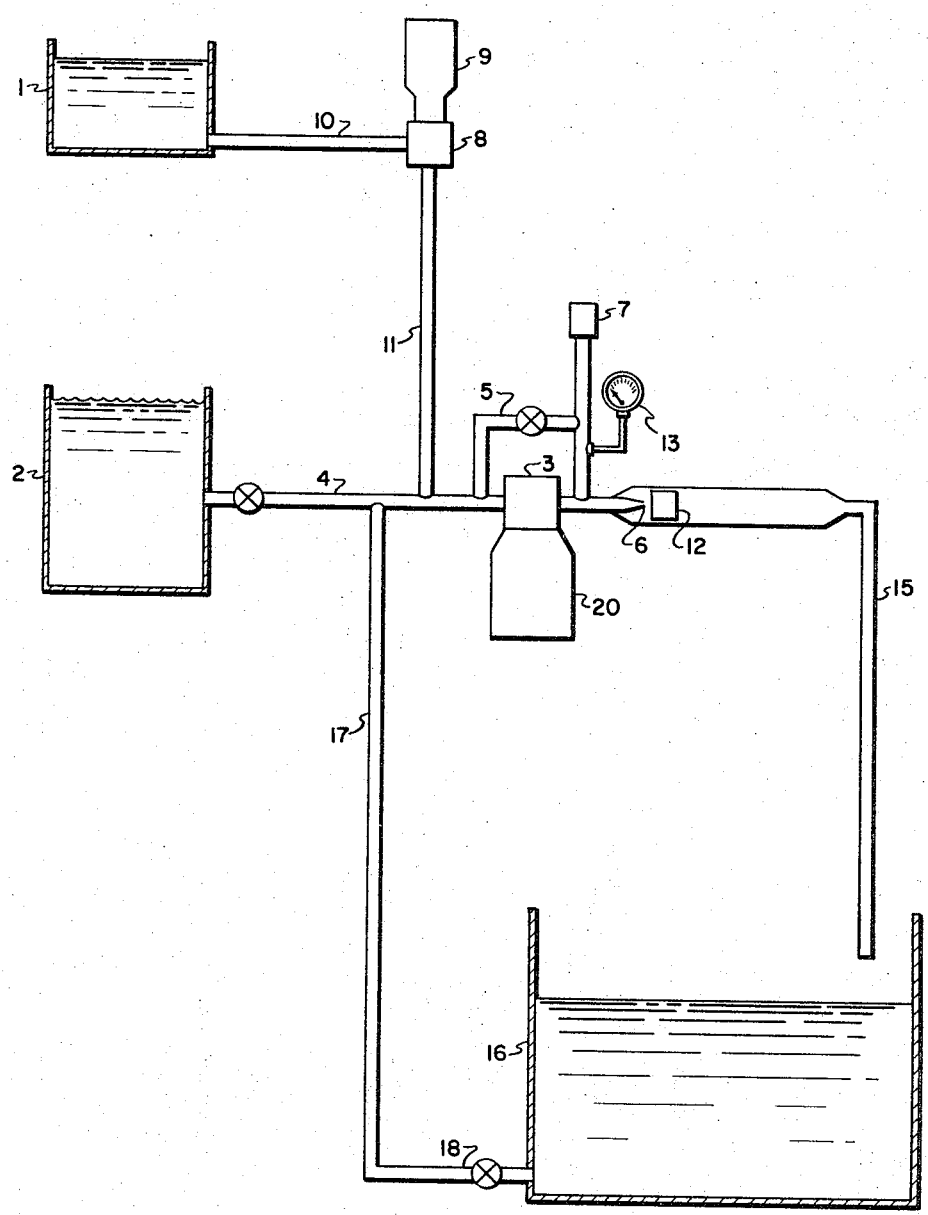

3,340,204
METHOD OF MANUFACTURING WAX
EMULSIONS
David M. MacLeod, Sarnia, Ontario, and David M. Leggett, Leaside, Ontario, Canada, assignors to Esso Research and Engineering Company, a corporation of Delaware
Filed Mar. 13, 1964, Ser. No. 351,802
2 Claims. (Cl. 252—311.5)

The present invention is concerned with a stable wax emulsion and with an improved technique for its manufacture. The invention is more specifically directed toward a wax emulsion which is utilized in the preparation or manufacture of wood particle board. The aqueous wax emulsion of the present invention comprises a particular wax emulsion which is rendered suitably stable by the utilization of particular types of emulsifiers. The emulsion is also prepared by a unique method, utilizing an ultrasonic homogenizer.

In the refining of hydrocarbon oils such as petroleum oils, it is known to segregate paraffin waxes from so-called paraffin distillates, waxy lubes and the like. The overhead or "paraffin distillate" fraction, for example, has a boiling range of about 580° F. to 850° F. and a viscosity of about 80 S.U.S. at 100° F. A heavy lubricating oil distillate side stream, for example, has a boiling range of about 800° F. to 1000° F. and a viscosity of about 50–70 S.U.S. at 210° F. The residuum comprises all the hydrocarbons boiling above this range and, for example, has a viscosity from about 150–200 S.U.S. at 210° F. Crystalline or paraffin waxes produced from the paraffin distillates have melting points which range from about 120° F. to 150° F. This type of wax is characterized by large well-formed crystals that can be readily separated from the oil. Furthermore, this type of wax generally contains a relatively small amount of oil and can be refined with comparative ease.

The segregation of these waxes is secured by a number of processes. For example, it is known to chill the selected wax-containing fraction in order to secure crystallization of the wax and to remove the wax crystals from the oil by filtering, centrifuging and the like. It is also known to use various dewaxing solvents such as liquid normally gaseous hydrocarbons, such as propane, as well as other solvents, such as methyl ethyl ketone, methyl isobutyl ketone, and the like. It is also known to utilize in dewaxing operations solvent mixtures wherein one solvent comprises a wax precipitating solvent while the other comprises a solvent having a high solubility for oil. A solvent mixture of this character, for example, comprises 40% by volume of toluene and 60% by volume of methyl ethyl ketone. In utilizing a mixture of this character, it has been the practice to add the mixture in toto or incrementally to the waxy distillate as it is being chilled. In dewaxing operations, it is also known to use various filter aids and other agents in order to render the dewaxing and filtering operations more efficient.

The wax segregated from the hydrocarbon oil, usually termed "slack wax," contains from about 10% to 40% of oil and has a melting point in the range of about 140° F. to 165° F. The slack wax is refined usually by conventional sweating to produce "crude scale wax" in a manner to reduce the oil content to less than about 5% by weight. The slack wax may be distilled to obtain the desired boiling range wax prior to sweating, if desired. This "crude scale wax" generally has an oil content of about 2% to 3% by weight. In order to remove this oil from the scale wax to produce a refined wax, such as a refined paraffin, having an oil content below about .5%, usually below about .3%, various procedures have been proposed and employed.

Alternatively, the slack wax may be processed by a solvent deoiling process, to remove oil from the wax. In this, the wax is dissolved in such solvents as methyl isobutyl ketone, methyl ethyl ketone, or mixtures of methyl ethyl ketone and toluene in a ratio of approximately 75 to 25, respectively. The wax solution is cooled to produce crystallization and the crystallized wax is removed by a process such as filtration. The filter cake of crystallized wax may be washed with cold solvent to remove occluded oil solution. The wax so produced may be an unfinished refined paraffin wax or an unfinished microcrystalline wax, depending on the nature of the slack wax feed, and on the selection of crystallization conditions. After oil removal from the wax, it is subjected to a finishing process such as clay percolation or hydrofining. In the latter, the process involves treating the unfinished wax with hydrogen gas at a rate of about 0.5 to 1.0 volume of wax per hour, at 500 to 800 p.s.i., at 500–600° F., in contact with cobalt molybdate catalyst. Or, at lower pressures such as 200 p.s.i., a nickel catalyst may be used. The hydrogen treated wax product is greatly improved with respect to color, odor and purity.

Waxes as described above are utilized in various operations such as in the manufacture of wood particle board. These waxes are utilized as wax emulsions. The wax emulsions generally are used as a means of applying the wax to wood particle board, paper, textiles, as well as to some metal and plastic products. A large part of the market for wax emulsions however is in the production of wood particle or fibreboard. In this process the wood chips are defibrated, generally by heating under high pressure steam and then by releasing the pressure abruptly. The wax emulsion is then added to the slurry of wood fibres in water. The wax emulsion may be broken at this point with alum in order to deposit or coat the wax particles on the fibres. The wax makes up from 1–3% by weight of the finished board and imparts to the finished board, among other qualities, water-proofness, thereby reducing the amount of undesirable water which can be absorbed.

A phenol-formaldehyde resin, which acts as a binder, is also added to the slurry simultaneously with the addition of the wax emulsion. After sufficient agitation to deposit the wax and resin on the fibres, the water is drained off and sheets of the treated material are compressed and steam heated to form the finished fibreboard.

Generally, the fibreboard industry purchases emulsions containing from about 30–50%, as for example, 40% by weight of wax. In accordance with the present invention, suitable stable emulsions are prepared by the utilization of an ultrasonic homogenizer wherein the wax and water are mixed with specific emulsifying agents to form the desired emulsion. Because of the small size and relatively low cost of the equipment, the emulsions can be made at the point of use, with resultant savings in transportation.

The technique of the present invention may be more fully understood by reference to the figure illustrating one embodiment of the same. Referring to the figure, wax in container 1 and water in container 2 are heated to a temperature by suitable means in the range from about 160° F. to 200° F., preferably at about 180° F. The emulsifiers are dissolved in the water, or in the wax, or in both. In operation, hot water is circulated through gear pump 3 by means of lines 4 and 5 so as to give an operating pressure in the range from about 180–220, as for example, about 200 pounds per square inch gage. This is secured by adjusting the orifice 6 to the desired degree. A pressure release valve 7 is positioned in the system in order to provide the necessary safety feature. When the desired pressure is secured at gear pump 3, gear pump 8 is operated by means of a variable speed drive means 9. This causes wax to flow from container 1 through line 10 and line 11 and to be mixed with the water flowing through line 4. This material or mixture is passed through orifice 6 and on to an ultrasonic homogenizer 12. At the preferred pressure of about 200 pounds per square inch, which is indicated by means of a pressure gage 13, the mixture impinges on the homogenizer or blade 12 which vibrates in the range from about 15,000 to 25,000, preferably about 22,000 cycles per second. The resulting cavitation and local pressure changes disperse the two phases. One satisfactory homogenizer is described in Bulletin 621 of the Sonic Engineering Corporation, of Connecticut, U.S.A.

The particular ultrasonic homogenizer used had a production rate of 7 to 8 gallons per minute. The primary objectives were to prepare emulsions containing 20 to 50% of SAE 30 slack wax (155° F. MP, 20% oil) which would be stable and would not break for 7 days. Up to 5% water separation was allowable so long as the emulsion was readily dispersible by agitation. For use in fibreboard manufacture, it is necessary for the emulsion not to break on dilution to 3%, or not break when the 3% emulsion is mixed with phenol-formaldehyde resin used as binder. It is considered that the quality of the emulsion produced in the user's plant and used within a few days does not have to be as high as that of emulsions undergoing shipment and required to withstand the resultant delay, agitation and temperature changes. Thus the emulsion passes through line 15 and is collected in container 16. Under certain conditions it may be desirable to recirculate the emulsion in 16 by means of line 17 controlled by means of valve 18. The pump is driven by a suitable conventional motor 20.

In accordance with the present invention, it is essential that particular emulsifying agents be utilized in order to secure the desired degree of stability so that the emulsion does not break on dilution or when the resin is added, but that it only break when alum or other precipitant is added. Thus two combinations of particular emulsifying agents are suitable.

The first is a particular mixture of: (a) 4 parts by weight of armas HT[1] and (b) 1 part by weight of stearic acid. The second is a particular mixture of: (a) 5 parts by weight of Tween (60)[2] and (b) 4 parts by weight of Span (60)[3]. The amount of these two emulsifier systems required to obtain stable emulsions was determined by making emulsions with the equipment and procedures previously described. The results are shown in Table I.

TABLE I.—AMOUNT OF EMULSIFIER REQUIRED
[20% emulsions of slack wax. One pass, Ultrasonic homogenizer]

| Emulsifier Content as Wt. Percent of Wax | | Stability of Emulsion | | |
|---|---|---|---|---|
| Armac HT | Stearic Acid | Percent Water Separated after 7 Days [1] | Dilution to 3% Wax [2] | Compatibility with Resins [3] |
| 0 | 0 | -------- | No emulsion | -------- |
| 0.75 | 0.50 | 5 | Broke | Fail. |
| 1.5 | 1.0 | 4 | ___do___ | Do. |
| 3.0 | 2.0 | 2 | ___do___ | Do. |
| 5.4 | 3.6 | [4] 1 | Stable | Borderline. |
| 7.2 | 1.8 | 4 | ___do___ | Pass. |
| Tween | Span 60 | | | |
| 2.5 | 2.0 | 3 | Broke | Fail. |
| 3.3 | 2.7 | 1 | Stable | Do. |
| 5.0 | 4.0 | 2 | ___do___ | Pass. |

[1] 20% emulsion stored in stoppered graduate flask. Percent settling measured.
[2] 20% emulsion diluted to 3% wax and examined for separation of wax particles.
[3] 3 ml. of phenol formaldehyde resin (42% non-volatile solids) added to 100 ml. of 3% wax emulsion and disperse by agitation. The emulsion was considered stable if less than 1 ml. cream (layer of solid particles) was found after 30 minutes.
[4] This emulsion showed some tendency to thicken but dispersed readily on dilution or shaking.

The amount of emulsifying mixture used may vary in the range from about 6% by weight to about 12% by weight, preferably 9% by weight. When using the first mixture described, the amount of Armac HT may vary in the range from about 3.5 to 4.5 parts by weight to 1 part by weight stearic acid. When utilizing the second mixture, the amount of Tween used may vary in the range from about 4.5 to 5.5 parts by weight to about 4 parts by weight of Span 60.

Additional tests were carried out using other types of commercial emulsifiers. The results secured are shown in Table II.

---

[1] The acetate salt of hydrogenated tallow amine (Armour and Co.). In the manufacture, tallow is hydrogenated to saturate the double bonds as, for example, at a temperature of 120–190° C., at a pressure in the range of 20 to 150 pounds per square inch utilizing a nickel catalyst. The hydrogenated tallow is then separated into fatty acids and glycerol by hydrolysis using steam at a temperature from about 240–250° C., at a pressure in the range of 650–700 pounds per square inch. Stearic acid is separated from the lower melting acids by crystallization and pressing. For the production of Armac HT, the mixture of acids obtained by hydrolysis of hydrogenated tallow is converted successively to the corresponding mixture of amides, using ammonia at about 200° C.; and to nitriles using an aluminum oxide catalyst at about 300° C.; and to fatty amines by hydrogenation at about 150° C. using a nickel catalyst. The Armac HT is mainly a mixture of the acetic acid salts of palmitic and stearic acids. The average molecular weight is about 330 and the melting point is about 60° C.

[2] From "Handbook of Material Trade Names" Supplement I, Zimmerman and Lavine. Published by Industrial Research Service, Dover, N.H., 1956, page 248. "A series of non-ionic surface-active agents used principally as emulsifiers, solubilizers, detergents, and wetting agents. They are polyoxyalkylene derivatives of the SPAN products (HBMTN p. 524), typical members of the series being TWEEN 20 (polyoxyethylene sorbitan monolaurate), TWEEN 40 (polyoxyethylene sorbitan monopalmitate), TWEEN 60 (polyoxyethylene sorbitan monooleate). Varying in form from thin oily liquids to waxy solids, they are generally water-soluble and tend to form oil-in-water emulsions."

[3] From "Handbook of Material Trade Names" Supplement I, Zimmerman and Lavine. Published by Industrial Research Service, Dover, N.H., 1956, page 221. "A series of non-ionic surface-active agents used principally as emulsifiers, dispersing agents, and wetting agents. They are fatty acid esters of sorbitol anhydrides, typical members of the series being SPAN 20 (sorbitan monolaurate); SPAN 40 (sorbitan monopalmitate); and SPAN 60 (sorbitan monooleate). They are generally oil-soluble, insoluble or dispersible in water, and tend to form water-in-oil emulsions. They are used in conjunction with the corresponding members of the TWEEN series (HBMTN p. 586) for oil-in-water emulsions. The laurates and oleates are oily liquids; the others are waxy solids."

TABLE II.—USE OF DIFFERENT EMULSIFYING AGENTS

Emulsions of 30% slack wax, one pass, ultrasonic homogenizer

| Emulsifier | Wt. Percent Based on Wax | Stability of Emulsion | | |
|---|---|---|---|---|
| | | Percent Water Separated after 7 Days | Dilution to 3% Wax | Compatibility with Resin |
| Commercial Emulsifier (A) | 9.0 | (¹) | | |
| Commercial Emulsifier (B) | 9.0 | (¹) | | |
| Commercial Emulsifier (C) | 4.2 | | | |
| Span 60 | 1.8 | 5 | Broke | Fail. |
| Commercial Emulsifier (D) | 7.2 | | | |
| Tween 81 | 1.8 | (¹) | | |
| Commercial Emulsifier (E) | 5.4 | | | |
| Span 60 | 1.8 | | | |
| Stearic Acid | 1.8 | (¹) | | |

¹ No emulsion.

From the above it is apparent that other emulsifiers did not produce the type of emulsion necessary for the production of particle board.

The emulsion is broken using a precipitant, preferably alum. Very satisfactory results were secured when 100 mils of a 5% wax emulsion was treated with 3 mils of a 5% aqueous alum solution. Thus in general the amount of alum used is in the range from about 1–4% by weight, preferably 3% by weight.

What is claimed is:

1. Process for the preparation of a wax emulsion suitable for use in the manufacture of wood particle board which comprises mixing slack wax at a temperature in the range from about 160° F. to 200° F. with water at a temperature of about 160° F. to 200° F. and with an emulsifier mixture of about 4 parts by weight of the acetate salt of hydrogenated tallow amine and about 1 part by weight stearic acid, passing the slack wax, water and emulsifier at a pressure in the range from about 180–220 pounds per square inch gage through an orifice and thereafter contacting the emulsion with an homogenizer vibrating in the range from about 15,000 to 25,000 cycles per second, whereby a stable wax emulsion is secured.

2. Process as defined by claim 1 wherein the water and slack wax are mixed at a temperature of about 180° F. and wherein the same is subjected to a pressure of about 200 pounds per square inch in the orifice and in the homogenizer.

References Cited

UNITED STATES PATENTS

| 2,380,166 | 7/1945 | Griffin | 252—311.5 |
| 2,407,462 | 9/1946 | Whiteley | 252—314 |
| 2,759,851 | 8/1956 | Fluck et al. | 106—271 X |

OTHER REFERENCES

"Ethofats, Ethomids, Ethomeens" published by Armour Chemical Division (Ill.) 1954, pp. 2 and 14.

LEON D. ROSDOL, *Primary Examiner.*

W. D. LOVERING, *Assistant Examiner.*